(12) United States Patent
Chen

(10) Patent No.: US 6,740,997 B1
(45) Date of Patent: May 25, 2004

(54) FRONT BRAKE OF AN ELECTRIC MOTOR

(76) Inventor: Cheng Hsian Chen, 1F., No. 166, Sec. 3, Tianjin Rd., Beitun District, Taichung City 406 (TW)

( * ) Notice: Subject to any disclaimer, the term of this patent is extended or adjusted under 35 U.S.C. 154(b) by 0 days.

(21) Appl. No.: 10/642,829

(22) Filed: Aug. 19, 2003

(65) Prior Publication Data (65)

(51) Int. Cl.⁷ ............................................... H02K 7/102
(52) U.S. Cl. ........................................... 310/77; 310/93
(58) Field of Search ........................... 310/75 R, 76–78, 310/92–99, 118, 123; 188/156–159, 161, 162

(56) References Cited

U.S. PATENT DOCUMENTS

| | | | | |
|---|---|---|---|---|
| 4,430,592 A | * | 2/1984 | Manktelow | 310/93 |
| 5,407,400 A | * | 4/1995 | Thomas et al. | 477/21 |
| 5,949,168 A | * | 9/1999 | Dieckmann et al. | 310/75 R |
| 6,515,385 B2 | * | 2/2003 | Kuivamaki | 310/77 |
| 6,617,728 B1 | * | 9/2003 | Wang | 310/77 |

\* cited by examiner

Primary Examiner—Dang Le
(74) Attorney, Agent, or Firm—Troxell Law Office PLLC

(57) ABSTRACT

The front brake of an electric motor has mechanical structure and is fitted on the output spindle at the front end of the electric motor, able to diminish the dimensions of an electric motor and save cost, and having no problem pertaining to circuit control and power compatibility in case of maintenance.

6 Claims, 9 Drawing Sheets

FRONT BRAKE OF AN ELECTRIC MOTOR

BACKGROUND OF THE INVENTION

1. Field of the Invention

This invention relates to the front brake of an electric motor, particularly to one having a simple mechanical structure to effectively control an electric motor and able to save cost.

2. Description of the Prior Art

A conventional electric motor 1 having function of braking and speed reducing, as shown in FIG. 1, is installed with an electromagnetic brake 2 at the rear side to control its shaft to carry out braking. That the electromagnetic brake 2 is installed at the rear side of the conventional electric motor 1 is mainly because the electric motor 1 has its front side provided with a speed-reducing device 3 to lower the speed and heighten the torsion of the output power of the electric motor 1 to let the spindle 4 at the front side of the electric motor 1 able to output a comparatively great power to drive the mechanical equipment connected with it. Under such a condition, after the speed-reducing device 3 carries out speed reduction, the spindle 4 will produce a torsion which is too huge to be braked by the electromagnetic brake 2; therefore the conventional electric motor 1 must have its electromagnetic brake 2 installed at the rear side so as to brake the shaft directly, thus increasing dimensions of the electric motor 1 and taking much space.

SUMMARY OF THE INVENTION

The objective of the invention is to offer a front brake of an electric motor, having mechanical structure and connected with an output spindle at the front end of an electric motor, diminishing the dimensions of an electric motor and saving cost and also having no problem involving circuit and electric source in maintenance.

Besides, the electromagnetic brake 2 of the conventional electric motor 1 is supplied with direct current for carrying out operation, but for the present almost all the factories and families are supplied with alternating current for use; therefore the electromagnetic brake 2 has to be additionally provided inside with a rectifier to convert alternating current into direct current and a control circuit, thus complicating its structure and increasing cost.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
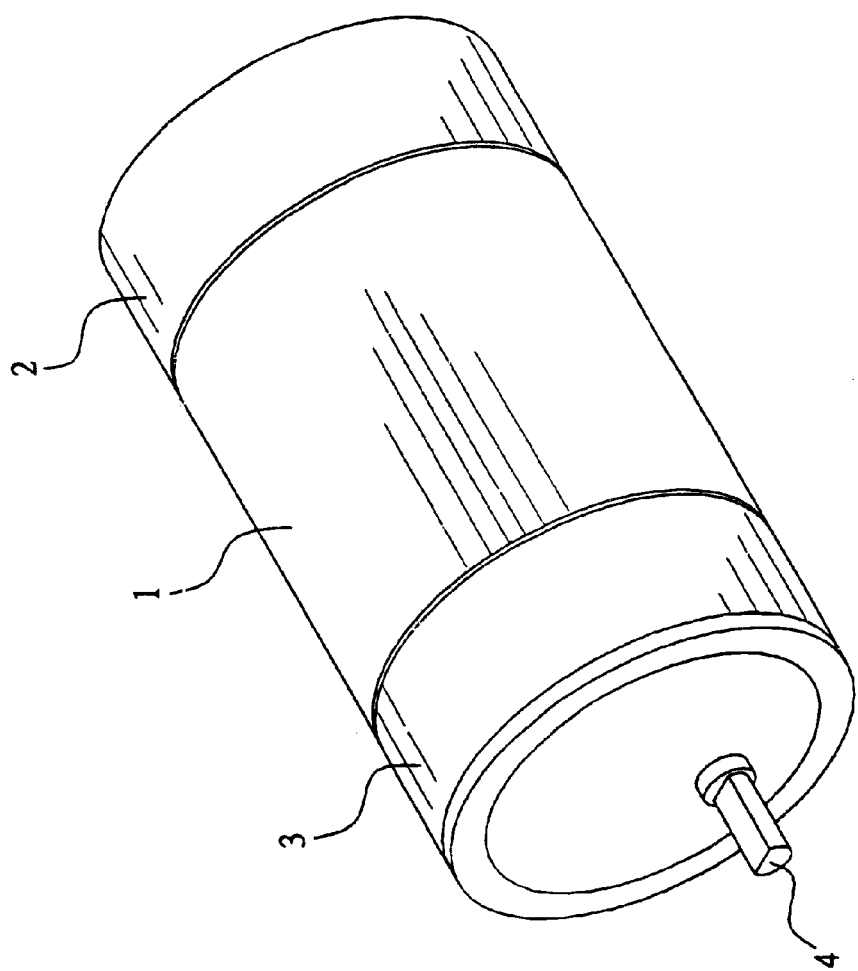
FIG. 1 is a perspective view of a conventional electric motor.
Figure 2:
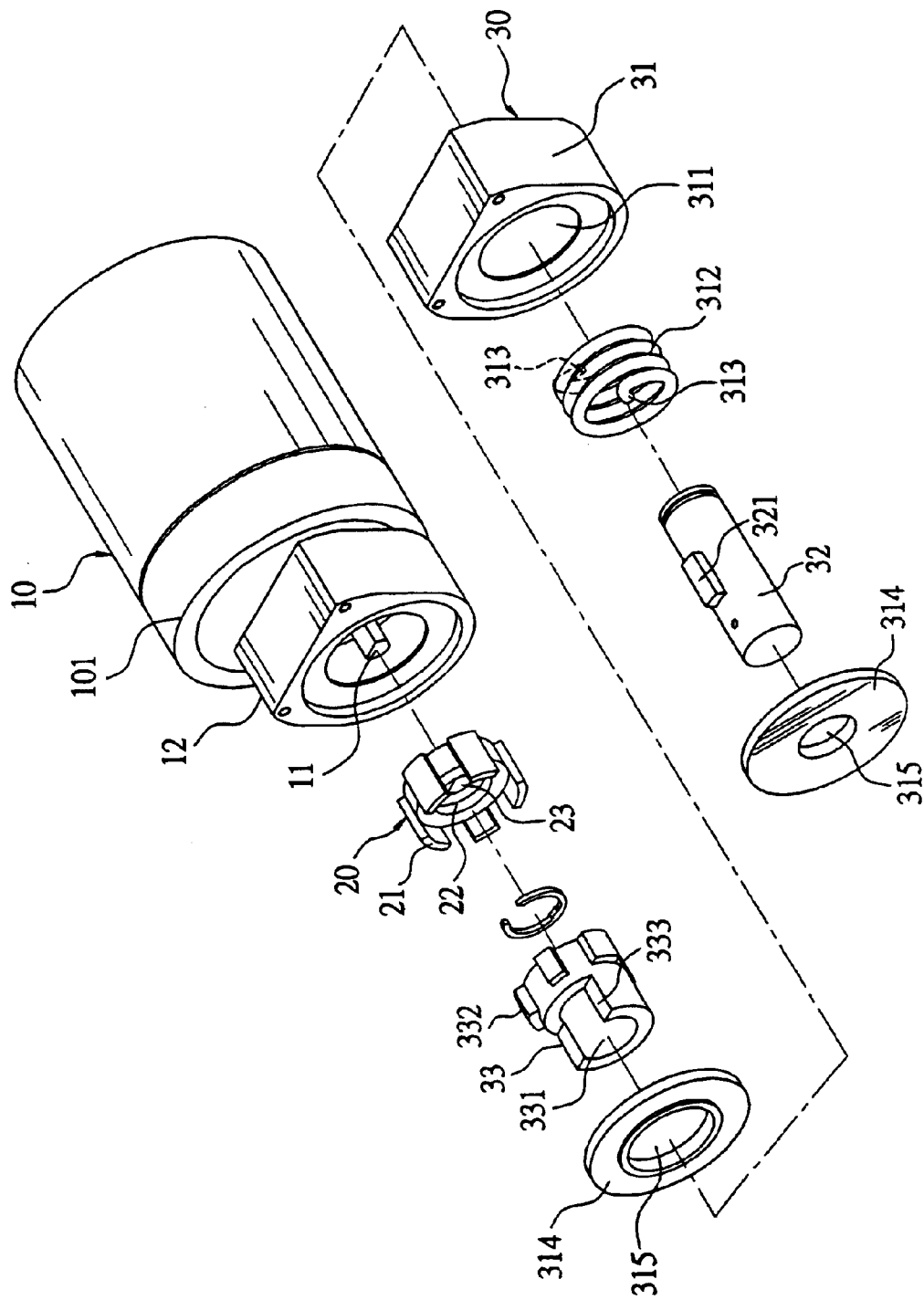
FIG. 2 is an exploded perspective view of a first preferred embodiment of the front brake of an electric motor in the present invention.
Figure 3:
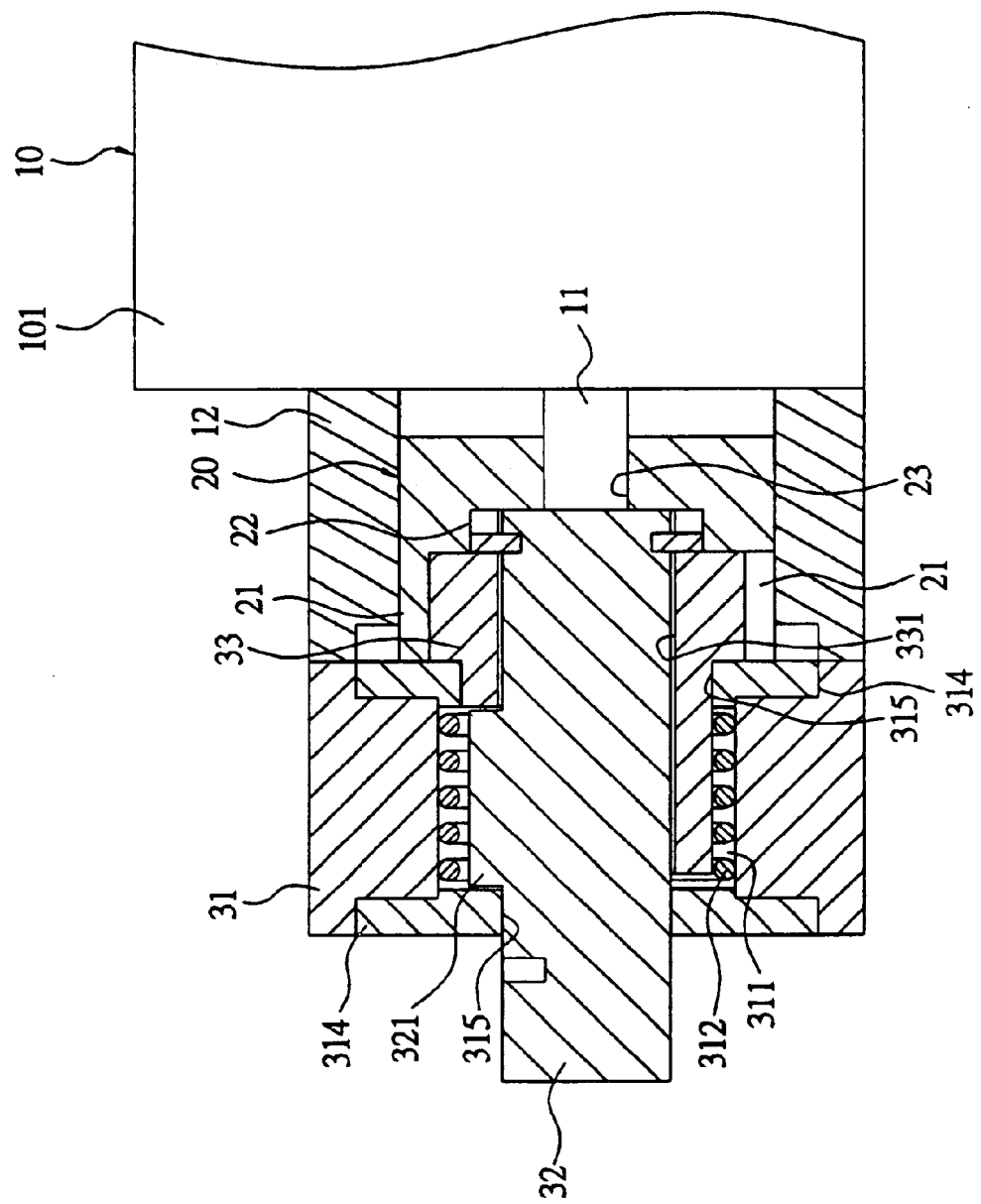
FIG. 3 is a cross-sectional view of the first preferred embodiment of the front brake of an electric motor in the present invention.

A first preferred embodiment of the front brake of an electric motor in the present invention, as shown in FIGS. 2 and 3, includes an electric motor 10, a shaft coupling rotary disc 20 and a brake 30 as main components combined together.

The electric motor 10 has a speed-reducing device 101 assembled at the front side, and the speed-reducing device 101 is provided with a power output spindle 11 extending outward at the front end for output of power and having its outer circumference fitted with a sleeve 12.

The shaft coupling rotary disc 20 has its outer circumferential edge provided with a plurality of engage members 21 extending forward and spaced apart equidistantly. The shaft coupling rotary disc 20 further has a recessed groove 22 and a through shaft hole 23 axially bored in the center. The shaft hole 23 and the spindle 11 have the same shape and are united with each other to rotate together.

Figure 4:
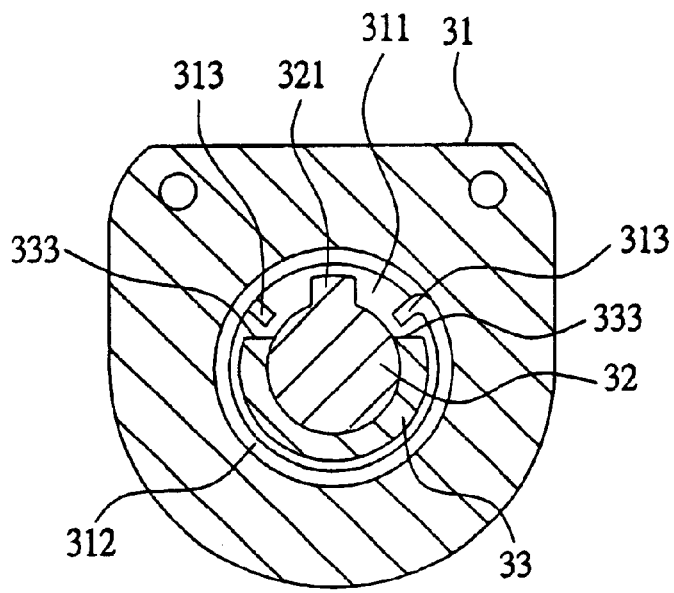
FIG. 4 is a side cross-sectional view of the first preferred embodiment of the front brake of an electric motor in the present invention.

The brake 30, as shown in FIG. 4, includes a base 31, a drive rod 32 and a controlling rotary member 33 combined together.

The base 31 shaped a hollow pillar has a round base hole 311 axially bored in the center for receiving a torsion spring 312 therein. The torsion spring 312 has two ends respectively bent inward to form an actuating member 313. Further, the base hole 311 of the base 31 has its opposite sides respectively covered by a sealing cover 314 having an axial insert hole 315 in the center.

The drive rod 32 shaped as an elongate column is positioned inside the torsion spring 312 after having its front inserted through the pivotal insert hole 315 of the front sealing cover 314. The drive rod 32 is provided with a protruding drive member 321 on a central portion to push against the outer side of the actuating member 313 of the torsion spring 312.

The controlling rotary member 33 is axially bored with a pivotal shaft hole 331 in the center and has its rear circumference formed with a serrated portion 332 to be engaged with the engage members 21 of the shaft coupling rotary disc 20. The front portion of the controlling rotary member 33 to be inserted in the base hole 311 of the base 31 has its opposite side edges respectively and symmetrically formed with an interacting surface 333 to push against the inner side of the actuating member 313 of the torsion spring 312. The drive rod 32 is pivotally inserted through the pivotal shaft hole 331 of the controlling rotary member 33 and has its drive member 321 protruding out of the pivotal shaft hole 331.

In assembling, as shown in FIG. 3, the shaft coupling rotary disc 20 is fitted with the front side of the electric motor 10, letting the spindle 11 inserted through the shaft hole 23 of the shaft coupling rotary disc 20. Then, the engage members 21 of the shaft coupling rotary disc 20 are engaged with the serrated portion 332 of the controlling rotary member 33 to assemble the shaft coupling rotary disc 20 together with the brake 30.

Figure 7:
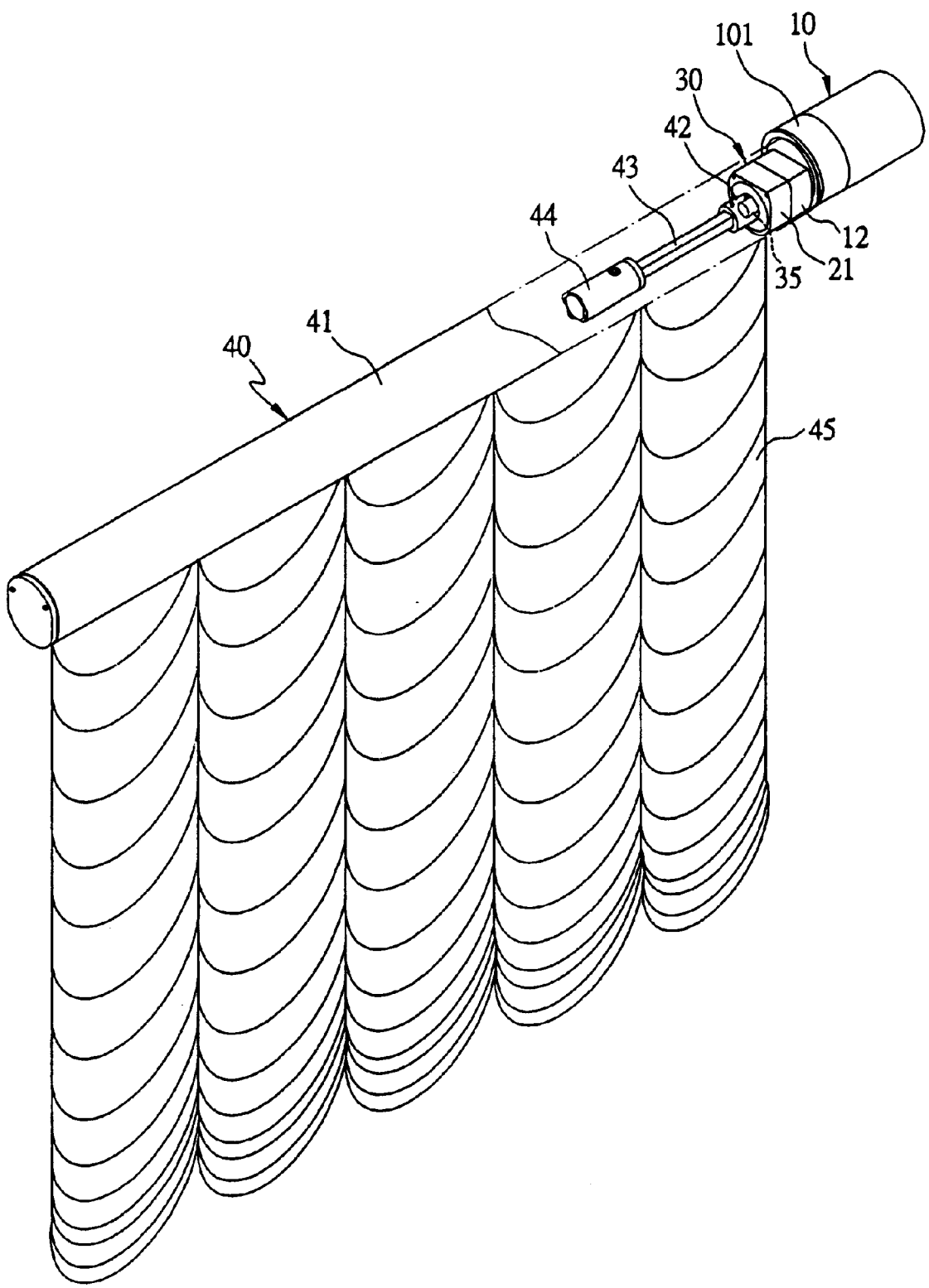
FIG. 7 is a perspective view of the first preferred embodiment of the front brake of an electric motor applied for pulling up a curtain in the present invention.

In using, as shown in FIG. 7, if the electric motor 10 of this invention is to be installed with a moving-up and-down curtain unit 40, the base 31 in front of the electric motor 10 is fitted in the rail frame 41 of the curtain unit 40 and connected to the rolling shaft 44 of the curtain unit 40 by means of a connecting sleeve 42 and a connecting rod 43, letting the drive rod 32 connected with the rolling shaft 44 of the elevating curtain 40 so as to actuate the curtain unit 40 to move up and down.

Figure 5:
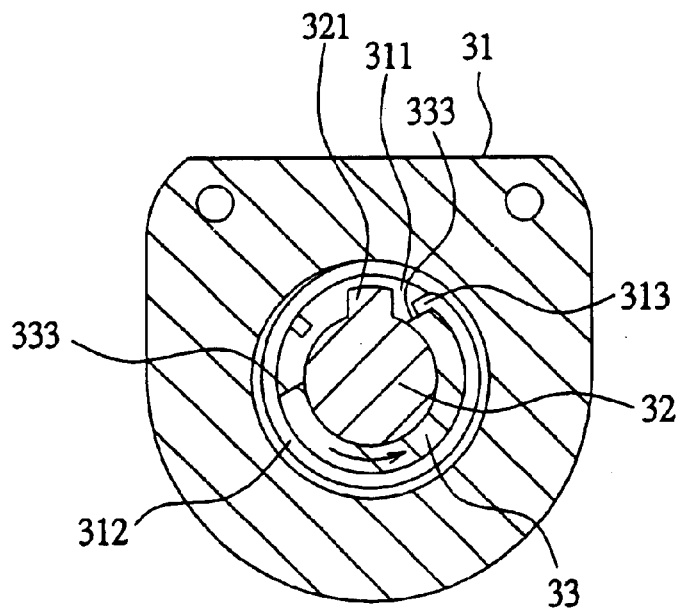
FIG. 5 is a side cross-sectional view of the first preferred embodiment of the front brake of an electric motor in the present invention, showing the spring constricted inward.
Figure 6:
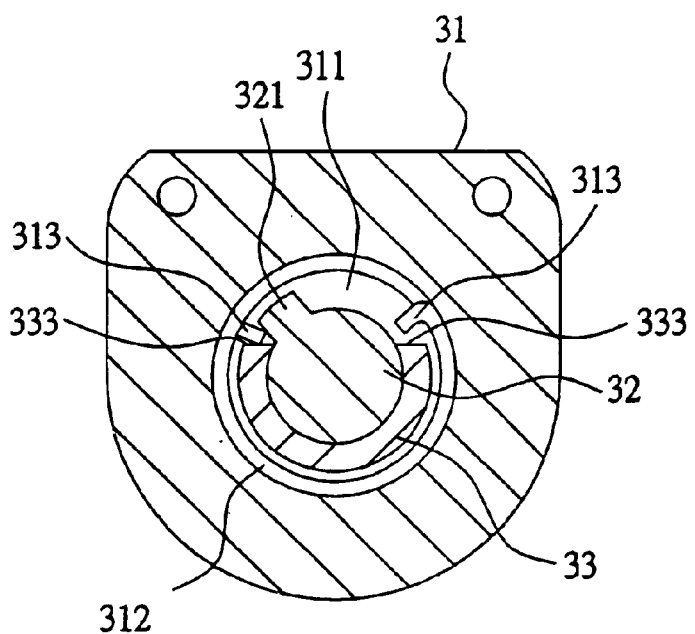
FIG. 6 is a side cross-sectional view of the first preferred embodiment of the front brake of an electric motor in the present invention, showing the spring expanded outward.

In operating, as shown in FIG. 5, when the electric motor 10 is started and the spindle 11 begins to rotate, the spindle 11 will actuate the interacting surfaces 333 of the controlling rotary member 33 to rotate clockwise or counterclockwise. When the interacting surfaces 333 of the controlling rotary member 33 is rotated to push against the inner side of one actuating member 313 of the torsion spring 312, the torsion spring 312 will be forced to constrict inward and separate from the inner circumferential edge of the base hole 311 of the base 31, letting the torsion spring 312 lose its expanding resilience. At this time, the controlling rotary member 33 will actuate the drive rod 32 to rotate together with the connecting rod 43 and the rolling shaft 44 of the curtain unit 40 to enable the curtain body 45 to move up and down. On the contrary, as shown in FIG. 6, when the electric motor 10 stops rotating, the curtain body 45 will hang down due to its own gravity and actuate the rolling shaft 44, the connecting rod 43, the connecting sleeve 42 and the drive rod 32 to rotate. At this time, the drive member 321 of the drive rod 32 will push the outer side of one actuating member 313 of the torsion spring 312 and force the torsion spring 312 to expand outward and closely push against the inner wall of the base bole 311 of the base 31 to form a braking function, letting the controlling rotary member 33 and the drive rod 32 as well as the connecting rod 43 stop rotating and the curtain body 45 impossible to move downward.

Thus, the power driven by the electric motor 10 can be controlled to actuate the curtain body 45 to move up and down by constricting the torsion spring 312 inward, or controlled to stop the curtain body 45 from moving downward due to its own gravity (or an external force) by expanding the torsion spring 312 outward.

Figure 8:
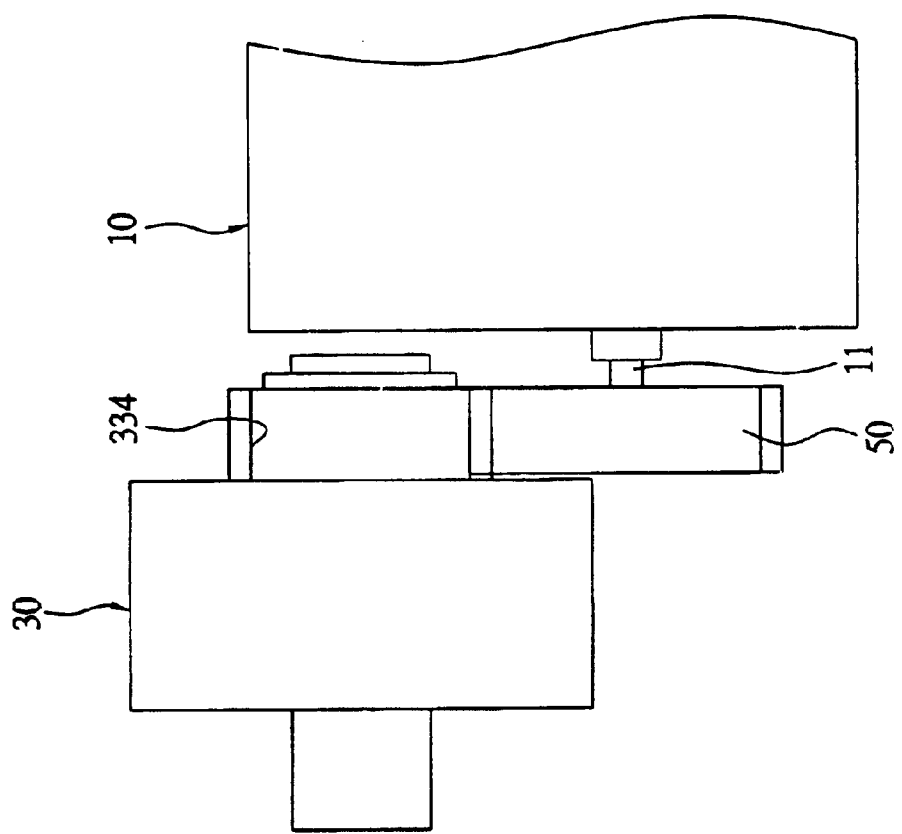
FIG. 8 is a front view of a second preferred embodiment of the front brake of an electric motor in the present invention.

A second preferred embodiment of the front brake of an electric motor 10 in the present invention, as shown in FIG. 8, is to have a gear 50 fitted on the spindle 11 of the electric motor 10. The gear 50 is directly engaged with the serrated portion 332 (equivalent to a gear) of the controlling rotary member 33. The power driven by the electric motor. 10 in the second preferred embodiment has the same actuating and braking function and effect as those described in the first preferred embodiment.

Figure 9:
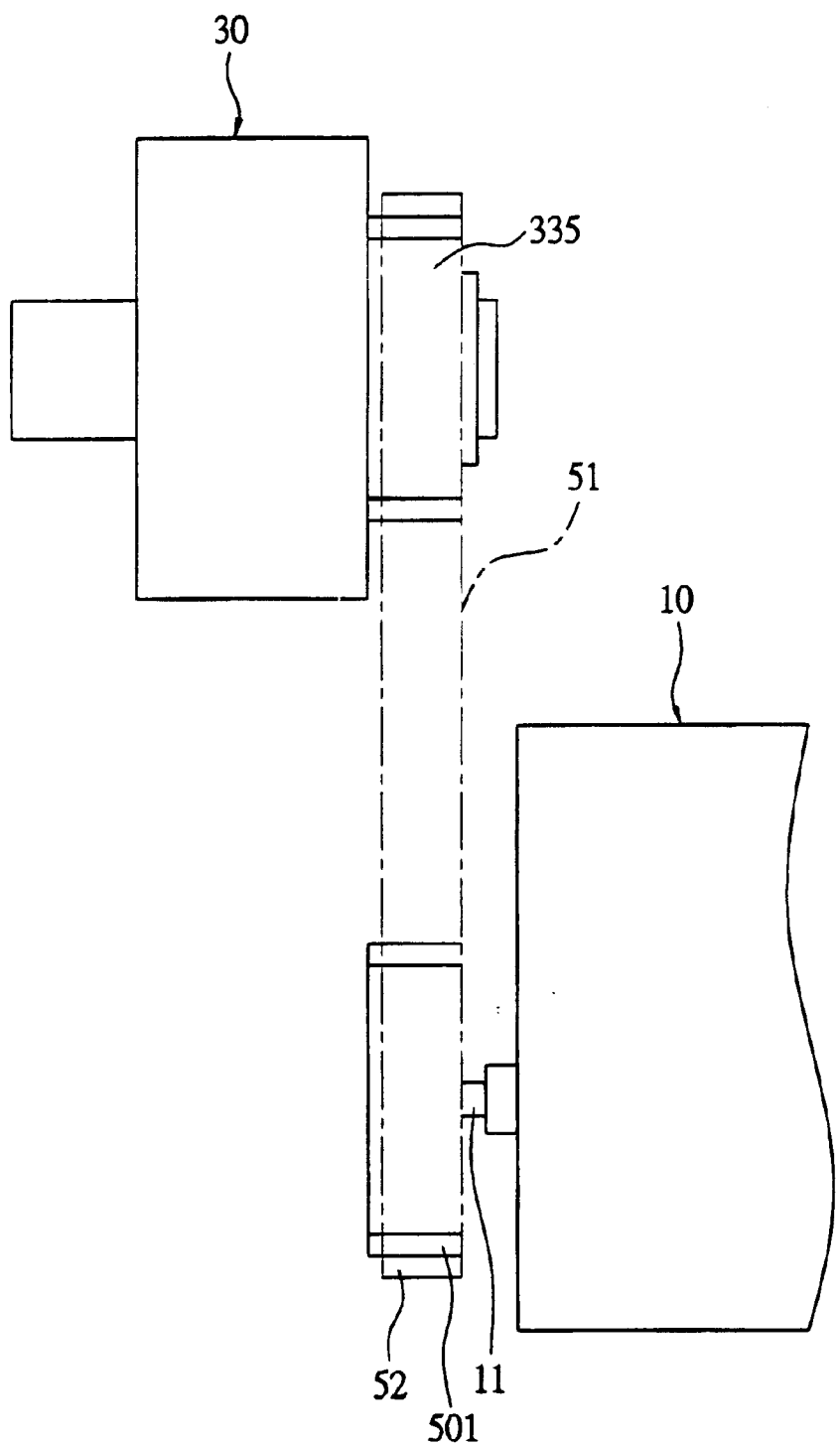
FIG. 9 is a front view of a third preferred embodiment of the front brake of an electric motor in the present invention.

A third preferred embodiment of the front brake of an electric motor in the present invention, as shown in FIG. 9, is to have a belt pulley 50 (gear-like) fitted on the spindle 11 of the electric motor 10. The belt pulley 50 is separated from the controlling rotary member 33 for a certain distance and they are connected to each other by a transmission belt 51. The teeth 52 of the transmission belt 51 (time-scale belt) and the gear 50 and the serrated portion 332 of the controlling rotary member 33 are engaged with one another. Thus, the electric motor 10 can be assembled with different mechanical devices in various ways, convenient in assembling and using. The power driven by the electric motor 10 in this preferred embodiment has the same actuating and braking function and effect as those described in the first preferred embodiment.

Figure 10:
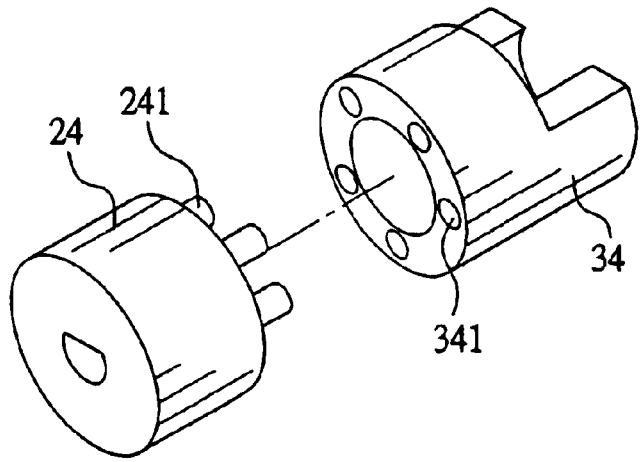
FIG. 10 is an exploded perspective view of a fourth preferred embodiment of the front brake of an electric motor in the present invention.

A fourth preferred embodiment of the front brake of an electric motor in the present invention, as shown in FIG. 10, is to have the front surface of the controlling rotary member 34 bored with plural insert holes 341, and one side of the shaft coupling rotary disc 24 provided with plural projecting studs 241 to be inserted in the insert holes 341 to combine the shaft coupling rotary disc 24 together with the controlling rotary member 34, equally enabling the electric motor 10 to actuate the brake to function.

Figure 11:
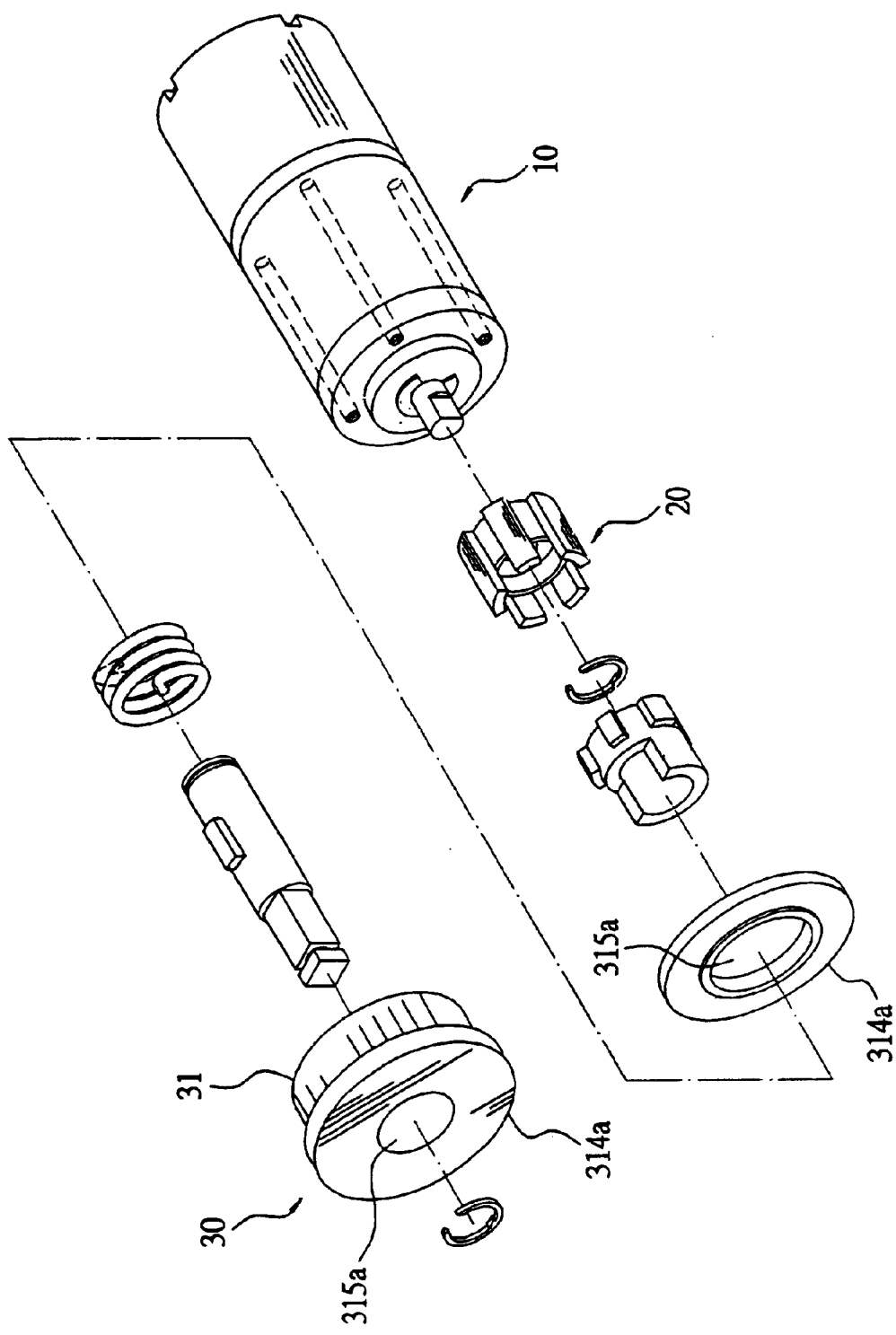
FIG. 11 is an exploded perspective view of a fifth preferred embodiment of the front brake of an electric motor in the present invention.

A fifth preferred embodiment of the front brake of an electric motor in the present invention, as shown in FIG. 11, includes an electric motor 10, a shaft coupling rotary disc 20 and a brake 30 combined together. The structure of the brake 30 in) the fifth preferred embodiment is almost the same as that in the first preferred embodiment, except that one sealing cover 314 (a) is formed integral on the front side of the base 31 and the other sealing cover 314 (a) is movably covered on the rear side of the base 31. The two sealing covers 314 (a) are respectively and axially bored with a pivotal insert hole 315 (a) in the center.

While the preferred embodiments of the invention have been described above, it will be recognized and understood that various modifications may be made therein and the appended claims are intended to cover all such modifications that may fall within the spirit and scope of the invention.

I claim:

1. The brake of an electric motor comprising:

an electric motor having a power output spindle extending outward at the front end:

a shaft coupling rotary disc having a plurality of engage members extending forward and spaced apart equidistantly around its outer circumferential edge, said shaft coupling rotary disc bored axially with a recessed groove and a shaft hole in the center, said shaft hole and said spindle having the same shape and coupled with each other to rotate together: and a brake comprising a base, a drive rod and a controlling rotary member:

said base provided inside with a round base hole for receiving a torsion spring therein, said torsion spring having two ends respectively bent inward to form an actuating member, said base hole having its opposite sides respectively covered by a sealing cover, each said sealing cover bored axially with a pivotal insert hole in the center:

said drive rod shaped as an elongate column, said drive rod positioned in said torsion spring after inserted through said pivotal insert hole of one said sealing cover, said drive rod provided with a drive member protruding upward at a central portion, said drive member of said drive rod pushing against said actuating member of said torsion spring: and, said controlling rotary member bored axially with a shaft hole, said controlling rotary member having its rear outer circumference formed with a serrated portion, said serrated portion engaging with said engage members of said shaft coupling rotary disc, said controlling rotary member having its front portion inserted in said round base hole of said base, the front portion of said controlling rotary member having its opposite side edges respectively formed with an interacting portion, said interacting surfaces of said controlling rotary member pushing against the inner side of said actuating members of said torsion spring, said drive rod pivotally inserted in said shaft hole of said controlling rotary member, said drive member of said drive rod protruding out of said pivotal shaft hole of said controlling rotary member.

2. The front brake of an electric motor as claimed in claim 1, wherein said spindle of said electric motor is fitted thereon with a gear to be directly engaging with said serrated portion of said controlling rotary member.

3. The front brake of an electric motor as claimed in claim 1, wherein a gear is fitted on said spindle of said electric motor, and a gear-like belt connects said gear and said serrated portion of said controlling rotary member, the teeth of said gear-like belt and said gear and said serrated portion of said controlling rotary member engaging with one another.

4. The front brake of an electric motor as claimed in claim 1, wherein said controlling rotary member is formed integral and axially bored with a shaft hole, having its front side bored with plural insert holes and its rear side formed with an interacting surfaces, said shaft coupling rotary disc having one end formed with plural protruding studs to be respectively fitted in said insert holes of said controlling rotary member.

5. The front brake of an electric motor as claimed in claim 1, wherein said base of said brake is axially bored in the center with a round base hole having its opposite sides respectively covered with a movable sealing cover.

6. The front brake of an electric motor as claimed in claim 1, wherein said base of said brake is axially bored with a round base hole in the center, and one said sealing cover on one side of said base hole is formed integral with said base, and the other said sealing cover on the other side of said base hole is movable.

* * * * *